United States Patent
Feng et al.

(10) Patent No.: US 11,187,867 B2
(45) Date of Patent: Nov. 30, 2021

(54) CAMERA LENS, LENS MODULE, AND ELECTRONIC DEVICE USING SAME

(71) Applicant: HON HAI PRECISION INDUSTRY CO., LTD., New Taipei (TW)

(72) Inventors: Ya-Lan Feng, New Taipei (TW); Chun-Cheng Ko, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 177 days.

(21) Appl. No.: 16/567,302

(22) Filed: Sep. 11, 2019

(65) Prior Publication Data

US 2020/0158982 A1 May 21, 2020

(30) Foreign Application Priority Data

Nov. 15, 2018 (CN) .......................... 201811361558.7

(51) Int. Cl.
*G02B 7/02* (2021.01)
*G02B 5/20* (2006.01)

(52) U.S. Cl.
CPC .............. *G02B 7/021* (2013.01); *G02B 5/20* (2013.01); *G02B 7/026* (2013.01)

(58) Field of Classification Search
CPC ... G02B 5/20; G02B 7/00; G02B 7/02; G02B 7/021; G02B 7/025; G02B 7/026
USPC ........................................................ 359/723
See application file for complete search history.

(56) References Cited

U.S. PATENT DOCUMENTS

| | | | | |
|---|---|---|---|---|
| 7,835,086 B2* | 11/2010 | Yamano | ......... | G02B 15/144113 359/704 |
| 8,526,129 B2* | 9/2013 | Hirata | .................... | G02B 7/021 359/819 |
| 10,162,146 B2* | 12/2018 | Breidenthal | ....... | G02B 23/2476 |
| 10,443,676 B2* | 10/2019 | Graham | .............. | G02B 27/644 |
| 2009/0219625 A1* | 9/2009 | Yamano | .............. | G02B 15/173 359/687 |
| 2013/0077183 A1* | 3/2013 | An | ......................... | G02B 7/022 359/819 |
| 2013/0301148 A1* | 11/2013 | Breidenthal | ............. | G02B 7/02 359/819 |
| 2015/0172521 A1* | 6/2015 | Yasukochi | ............. | G02B 7/021 348/373 |
| 2016/0084281 A1* | 3/2016 | Lamontagne | ......... | F16B 43/004 248/314 |
| 2017/0139175 A1* | 5/2017 | Wei | ........................ | G02B 7/025 |
| 2017/0343763 A1* | 11/2017 | Hasegawa | .............. | G02B 7/021 |

(Continued)

FOREIGN PATENT DOCUMENTS

| | | |
|---|---|---|
| CN | 207528948 U | 6/2018 |
| TW | 201734534 A | 10/2017 |

(Continued)

*Primary Examiner* — William R Alexander
(74) *Attorney, Agent, or Firm* — ScienBiziP, P.C.

(57) ABSTRACT

A camera lens with complete symmetry reduces or avoids light deviation and stray light reflections in a lens group, notwithstanding manufacturing marks and defects. A lens barrel and a lens group are also disclosed. The lens barrel is a hollow structure for receiving the lens group. The lens group defining at least one recess on an outer sidewall as a manufacturing mark receives a layer of black glue to improve the integrity of shape. A lens module and an electronic device using such a camera lens is also provided.

14 Claims, 4 Drawing Sheets

(56) References Cited

U.S. PATENT DOCUMENTS

| | | | |
|---|---|---|---|
| 2018/0164530 A1* | 6/2018 | Wei | G02B 7/025 |
| 2019/0085931 A1* | 3/2019 | Graham | H04N 5/2254 |
| 2020/0057238 A1* | 2/2020 | Wang | G02B 3/04 |
| 2020/0057283 A1* | 2/2020 | Wang | G02B 13/0015 |
| 2020/0162648 A1* | 5/2020 | Wang | H04N 5/2257 |

FOREIGN PATENT DOCUMENTS

| | | |
|---|---|---|
| TW | I623777 B | 5/2018 |
| TW | I627460 B | 6/2018 |

\* cited by examiner

CAMERA LENS, LENS MODULE, AND ELECTRONIC DEVICE USING SAME

FIELD

The subject matter herein generally relates to imaging elements in electronic devices.

BACKGROUND

Plastic lenses are usually made by injection molding. A plastic lens may have a recess on a sidewall during shearing of the lens. When light is incident on the recess, the light deviates from the original optical path, thereby producing stray light and affecting the imaging quality of the lens module. The conventional methods to reduce the impact of the recess on the imaging quality is to set the recess in a specific direction away from which the shooting angle of the lens module is spaced, however such method do not always work.

Therefore, there is room for improvement.

BRIEF DESCRIPTION OF THE DRAWINGS

Implementations of the present technology will now be described, by way of embodiments, with reference to the attached figures.

DETAILED DESCRIPTION

The present disclosure is made in conjunction with the accompanying drawings. Specific embodiments of the present disclosure are described.

In the following description, when an element is described as being "fixed to" another element, the element can be fixed to the another element with or without intermediate elements. When an element is described as "connecting" another element, the element can be connected to the other element with or without intermediate elements.

Without a given definition otherwise, all terms used have the same meaning as commonly understood by those skilled in the art. The term "and/or" means including any and all combinations of one or more of associated listed items.

Figure 1:
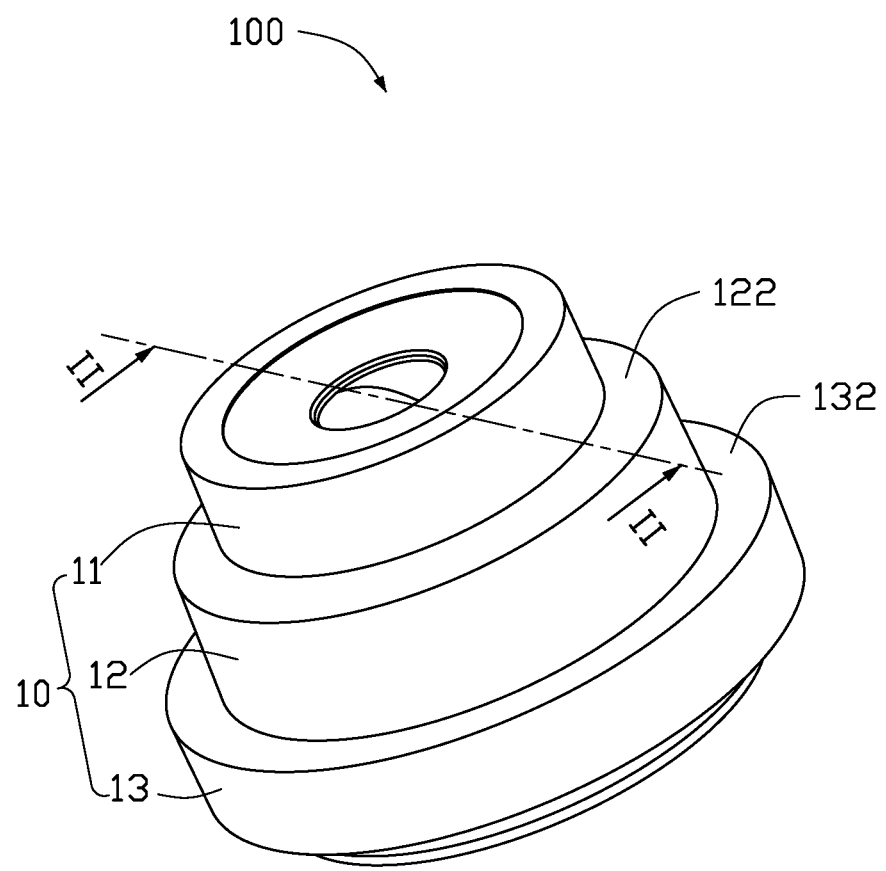
FIG. 1 is an isometric view of a lens module according to an embodiment of the present disclosure.
Figure 2:
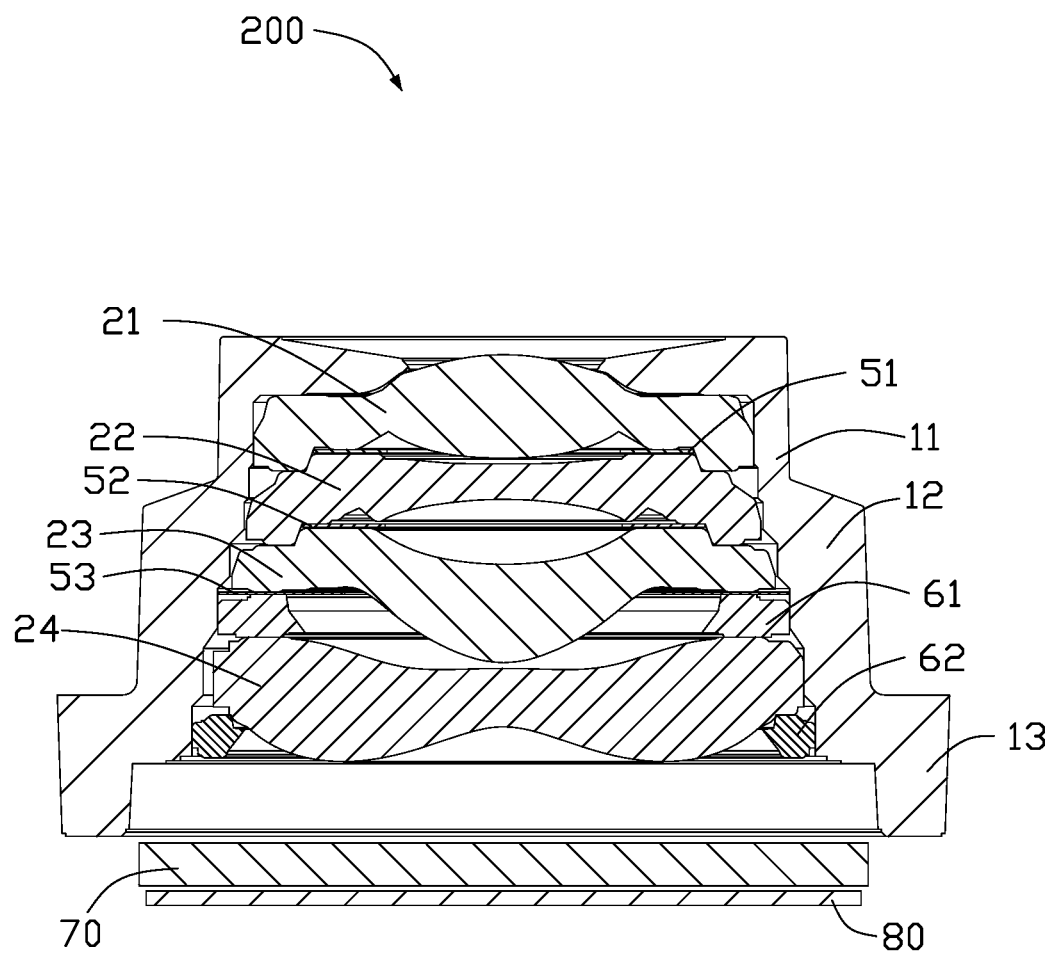
FIG. 2 is a cross-sectional view taken along line II-II of FIG. 1.
Figure 3:
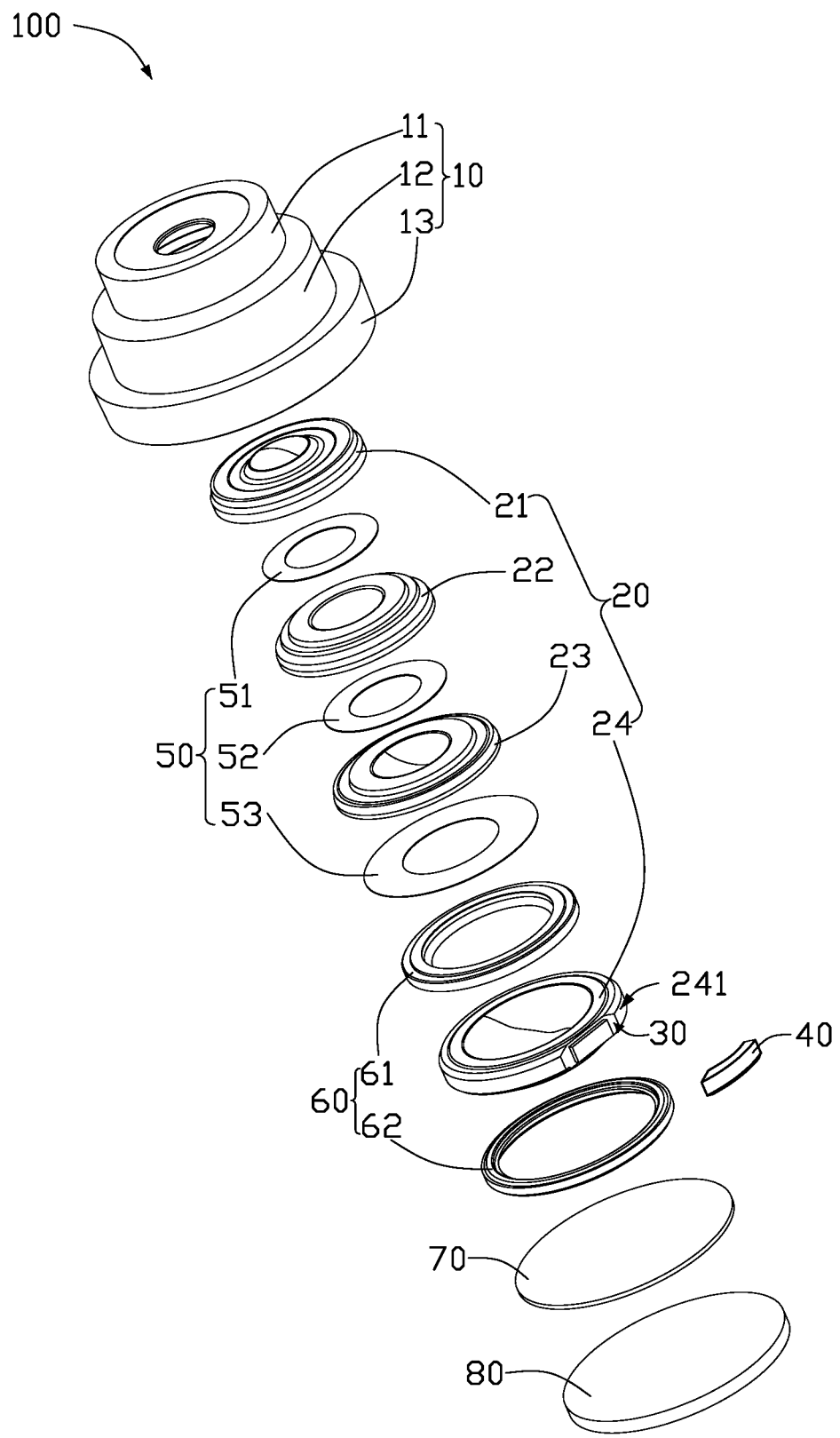
FIG. 3 is an exploded view of the lens module of FIG. 1.

Referring to FIGS. 1-3, a lens module 200 includes a camera lens 100. The camera lens 100 includes a lens barrel 10, a lens group 20, and a filter 70.

The lens barrel 10 is a straight tube or stepped hollow structure. In this embodiment, the lens barrel 10 has a stepped hollow structure and includes a first barrel portion 11, a second barrel portion 12, and a third barrel portion 13. The second barrel portion 12 is connected between the first barrel portion 11 and the third barrel portion 13. Diameters of the first barrel portion 11, the second barrel portion 12, and the third barrel portion 13 sequentially increase, thereby a first step 122 is formed between the second barrel portion 12 and the first barrel portion 11, and a second step 132 is formed between the second barrel portion 12 and the third barrel portion 13. The lens barrel 10 is formed by assembling the first barrel portion 11, the second barrel portion 12, and the third barrel portion 13 together or the barrel 10 can be integrally formed. The lens barrel 10 is made of metal or plastic. In the embodiment, the lens barrel 10 is made of an aluminum alloy.

The lens group 20 is axially housed in the lens barrel 10. The lens group 20 includes a first lens 21, a second lens 22, a third lens 23, and a fourth lens 24 in a stack. The first lens 21 is housed in the first barrel portion 11. The second lens 22 is partially housed in the first barrel portion 11 and partially housed in the second barrel portion 12. The third lens 23 is housed in the second barrel portion 12. The fourth lens 24 is partially housed in the second barrel portion 12 and partially housed in the third barrel portion 13.

The first lens 21, the second lens 22, the third lens 23, and the fourth lens 24 can be made of resin with good light transmittance. The first lens 21, the second lens 22, the third lens 23, and the fourth lens 24 are made by an injection molding process. The first lens 21, the second lens 22, the third lens 23, and the fourth lens 24 each form a recess at an outer sidewall during shearing of the molding. In the embodiment, only the recess 30 of the fourth lens 24 is shown in the figures. The recess 30 is defined on the outer sidewall 241 of the fourth lens 24. In other embodiments, only some of the first lens 21, the second lens 22, the third lens 23, and the fourth lens 24 have the recess.

A glue layer 40 is disposed in the recess 30. The glue layer 40 is an aerosol, a liquid sol, or a solid sol. In the embodiment, the glue layer 40 is a layer of black UV-curable glue. The black UV glue is a one-component item that does not need to be remixed with other component. The black UV glue has excellent light blocking effect and adhesion, and its viscosity, color, and adhesion can be adjusted. The black UV glue can be dispensed in the recess 30 by an automatic dispenser (not shown). The automatic dispensing machine has the characteristics of high speed, high efficiency, and high precision. The black UV glue in the recesses brings the lens group 20 towards a better circular symmetry, thereby relieving the problem of light deviation and reducing stray light produced by the deviation. Moreover, the black glue layer is less reflective, and effectively reduces stray light and its reflection.

In the embodiment, the camera lens 100 further includes a spacer group 50. The spacer group 50 is received in the lens barrel 10. The spacer group 50 includes a first spacer 51, a second spacer 52, and a third spacer 53. The first spacer 51 is sandwiched between the first lens 21 and the second lens 22 and housed in the first barrel portion 11. The second spacer portion 52 is sandwiched between the second lens 22 and the third lens 23 and housed in the second barrel portion 12. The third spacer portion 53 is sandwiched between the third lens 23 and the fourth lens 24 and housed in the second barrel portion 12.

In the embodiment, the first lens 21, the second lens 22, the third lens 23, and the fourth lens 24 each includes an optical portion (not labeled) and a convex portion (not labeled) surrounding the optical portion. The first spacer 51 is sandwiched between the optical portions of the first lens 21 and the second lens 22, and is surrounded and positioned by the convex portion of the first lens 21. The second spacer 52 is sandwiched between the optical portions of the second lens 22 and the third lens 23, and is surrounded and positioned by the optical portion of the second lens 22. The third spacer 53 is sandwiched between the convex portions of the third lens 23 and the fourth lens 24, and is surrounded and positioned by the second barrel portion 12 of the lens barrel 10. The first spacer 51, the second spacer 52, and the third spacer 53 are all rings. The first spacer 51, the second spacer 52, and the third spacer 53 are light shielding sheets for shielding against stray light.

In the embodiment, the optical lens 100 further includes a ring group 60. The ring group 60 is received in the lens barrel 10. The ring group 60 includes a first ring 61 and a second ring 62. The first ring 61 is sandwiched between the convex portions of the third spacer portion 53 and the fourth lens 24, and is received in the second barrel portion 12. The second ring 62 is located on a side of the convex portion of the fourth lens 24 away from the third spacer portion 53, and is received in the third barrel portion 13. The first ring 61 is surrounded and positioned by the second barrel portion 12 of the lens barrel 10. The second ring 62 is coupled to the fourth lens 24 by an adhesive (not shown). The first ring 61 and the second ring 62 are both circular. The first ring 61 is used to separate and space the third lens 23 and the fourth lens 24. The second ring 62 is used to fix the lens group 20 in the lens barrel 10.

The filter 70 is located outside of the lens barrel 10 and is disposed apart from the lens group 20. The filter 70 is located on a side of the third barrel portion 13 away from the second barrel portion 12. The filter 70 filters out a portion of light which is in a specific wavelength band incident on the optical lens 100 from the outside. The filter 70 can be made of plastic or glass with a specific dye added. The filter 70 is circular, square, or has other shape. In the embodiment, the filter 70 is circular.

In the embodiment, the lens module 200 includes the optical lens 100 and an image sensor 80. The image sensor 80 is located on a side of the filter 70 away from the third barrel portion 13. The image sensor 80 receives light allowed by the filter 70. The image sensor 80 is circular, square, or has other shape. In the embodiment, the image sensor 80 is circular.

Figure 4:
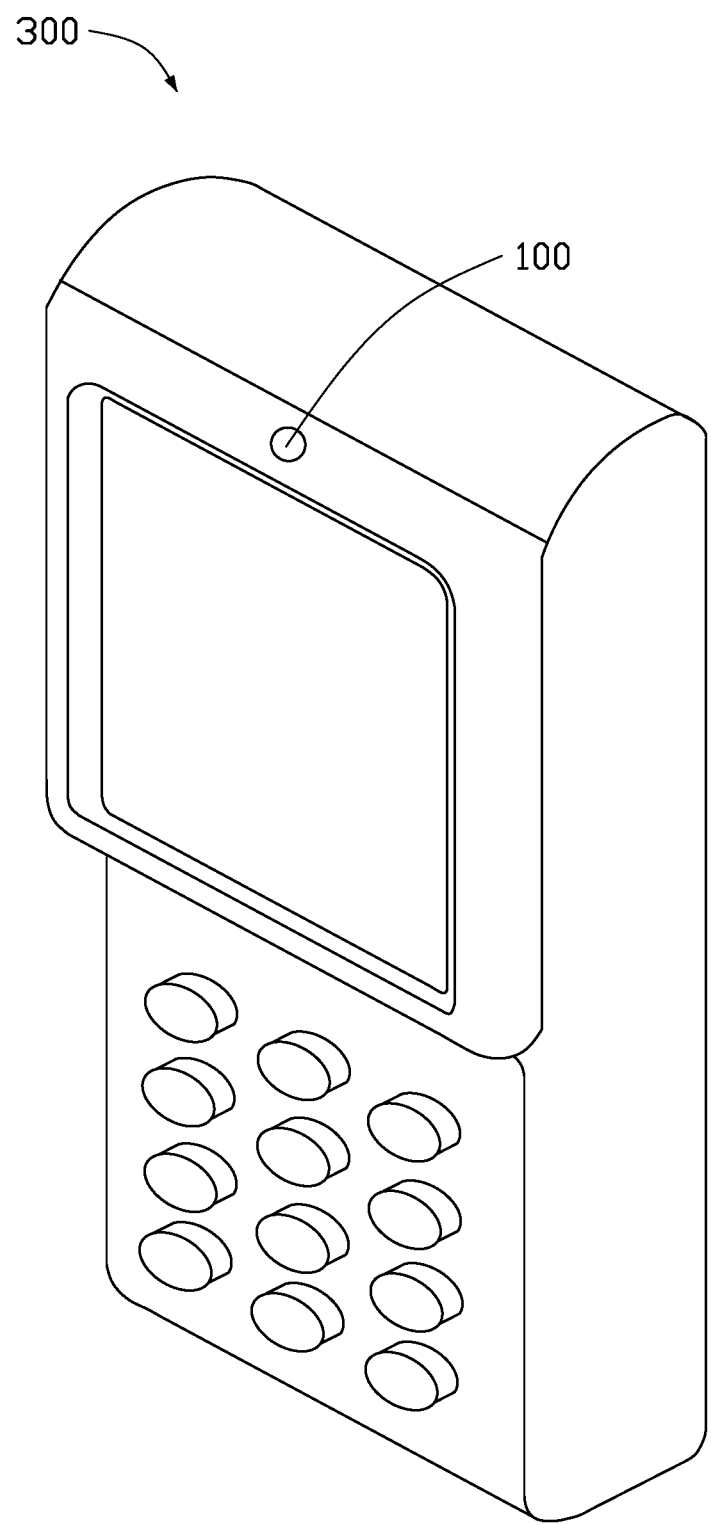
FIG. 4 is a perspective view of an electronic device in which the lens module of FIG. 1 is installed according to an embodiment of the present disclosure.

Referring to FIG. 4, the lens module 200 can be applied to various electronic devices 300 having camera modules, such as mobile phones, wearable devices, computer devices, televisions, vehicles, cameras, or monitoring devices. In the embodiment, the lens module 200 is applied to a mobile phone.

The camera lens 100 disclosed firstly provides the glue layer 40 in the recess 30. The lens group 20 accordingly has a better shape and complete symmetry, thereby relieving the problem of light deviation from an optical path. The glue layer is black and less reflective to light. In addition, since the black UV glue is a material that can be easily obtained and utilized, the cost of the camera lens 100 can be greatly reduced in mass production and use.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. A camera lens comprising a lens barrel and a lens group, wherein the lens barrel is a hollow structure configured for receiving the lens group, the lens group defines at least one recess on an outer sidewall thereof, the recess is disposed with a glue layer;

wherein the lens group comprises a first lens, a second lens, a third lens and a fourth lens arranged in sequence as stated;

wherein the camera lens further comprises a spacer group received in the lens barrel, the spacer group comprises a first spacer, a second spacer and a third spacer, the first spacer is sandwiched between the first lens and the second lens, the second spacer is sandwiched between the second lens and the third lens, and the third spacer portion is sandwiched between the third lens and the fourth lens;

wherein the optical lens further comprises a ring group received in the lens barrel, the ring group comprises a first ring and a second ring, the first ring is sandwiched between the third spacer and the fourth lens, the second ring is on a side of the fourth lens away from the third spacer portion.

2. The camera lens according to claim 1, wherein each of the first lens, the second lens, the third lens, and the fourth lens defines a recess on an outer sidewall thereof, and the recess is disposed with the glue layer.

3. The camera lens according to claim 1, wherein the lens barrel comprises a first barrel portion, a second barrel portion and a third barrel portion, the second barrel portion is connected between the first barrel portion and the third barrel portion, diameters of the first barrel portion, the second barrel portion, and the third barrel portion sequentially increase.

4. The camera lens according to claim 3, wherein the first lens is received in the first barrel portion, the second lens portion is partially received in the first barrel portion and partially received in the second barrel portion, the third lens is received in the second barrel portion, and the fourth lens is partially received in the second barrel portion and partially received in the third barrel portion.

5. The camera lens according to claim 1, wherein the lens group is made of resin.

6. The camera lens according to claim 4, wherein the first spacer is received in the first barrel portion, the second spacer is received in the second barrel portion, and the third spacer portion is received in the second barrel portion.

7. The camera lens according to claim 3, wherein the camera lens further comprises a filter located outside of the lens barrel and disposed apart from the lens group, the filter is located on a side of the third barrel portion away from the second barrel portion.

8. A lens module comprising a camera lens, the camera lens comprising a lens barrel and a lens group, wherein the lens barrel is a hollow structure for receiving the lens group, the lens group defines at least one recess on an outer sidewall thereof, the recess is disposed with a glue layer;

wherein the lens group comprises a first lens, a second lens, a third lens and a fourth lens arranged in sequence as stated;

wherein the camera lens further comprises a spacer group received in the lens barrel, the spacer group comprises a first spacer, a second spacer and a third spacer, the first spacer is sandwiched between the first lens and the second lens, the second spacer is sandwiched between the second lens and the third lens, and the third spacer portion is sandwiched between the third lens and the fourth lens;

wherein the optical lens further comprises a ring group received in the lens barrel, the ring group comprises a first ring and a second ring, the first ring is sandwiched between the third spacer and the fourth lens, the second ring is on a side of the fourth lens away from the third spacer portion.

9. The lens module according to claim 8, further comprising an image sensor, wherein the lens barrel comprises a first barrel portion, a second barrel portion and a third barrel portion, the second barrel portion is connected between the first barrel portion and the third barrel portion, diameters of the first barrel portion, the second barrel portion, and the third barrel portion sequentially increase, the image sensor is located on a side of the third barrel portion away from the second barrel portion.

10. The lens module according to claim 9, wherein the camera lens further comprises a filter located outside of the lens barrel and disposed apart from the lens group, the filter is located between the lens group and the image sensor.

11. The lens module according to claim 8, wherein the at least one recess is defined on one or more of the first lens, the second lens, the third lens and the fourth lens.

12. An electronic device comprising a lens module, the lens module comprising a camera module, the camera lens comprising a lens barrel and a lens group, wherein the lens barrel is a hollow structure configured for receiving the lens group, the lens group defines a recess on an outer sidewall thereof, the recess is disposed with a glue layer;

wherein the lens group comprises a first lens, a second lens, a third lens and a fourth lens arranged in sequence as stated;

wherein the camera lens further comprises a spacer group received in the lens barrel, the spacer group comprises a first spacer, a second spacer and a third spacer, the first spacer is sandwiched between the first lens and the second lens, the second spacer is sandwiched between the second lens and the third lens, and the third spacer portion is sandwiched between the third lens and the fourth lens;

wherein the optical lens further comprises a ring group received in the lens barrel, the ring group comprises a first ring and a second ring, the first ring is sandwiched between the third spacer and the fourth lens, the second ring is on a side of the fourth lens away from the third spacer portion.

13. The electronic device according to claim 12, wherein each of the first lens, the second lens, the third lens, and the fourth lens defines a recess on an outer sidewall thereof.

14. The electronic device as claimed in claim 12, wherein the glue layer is a layer of black UV-curable glue.

* * * * *